(12) United States Patent
Fidler et al.

(10) Patent No.: US 9,620,039 B2
(45) Date of Patent: Apr. 11, 2017

(54) BARREL-SHAPED FOLDABLE AND LOWERABLE DISPLAY ARRANGEMENT

(75) Inventors: Franz Bernhard Fidler, Vienna (AT); Andreas Haas, Gratkorn (AT); Elmar Stoger, Erlach an der Pitten (AT); Alexander Josef Swatek, Gussing (AT); Jorg Tragatschnig, Zell am See (AT)

(73) Assignee: C SEED Technologies GmbH, Gussing (AT)

( * ) Notice: Subject to any disclaimer, the term of this patent is extended or adjusted under 35 U.S.C. 154(b) by 533 days.

(21) Appl. No.: 14/343,456

(22) PCT Filed: Sep. 5, 2012

(86) PCT No.: PCT/EP2012/067256
§ 371 (c)(1),
(2), (4) Date: Jun. 2, 2014

(87) PCT Pub. No.: WO2013/034566
PCT Pub. Date: Mar. 14, 2013

(65) Prior Publication Data
US 2014/0251929 A1    Sep. 11, 2014

(30) Foreign Application Priority Data

Sep. 9, 2011    (EP) .................................. 11180778

(51) Int. Cl.
*G09F 19/22*    (2006.01)
*G09F 27/00*    (2006.01)
(Continued)

(52) U.S. Cl.
CPC ............ *G09F 19/22* (2013.01); *G06F 3/1446* (2013.01); *G09F 7/002* (2013.01); *G09F 9/3026* (2013.01);
(Continued)

(58) Field of Classification Search
CPC ............... G09F 9/3026; G09F 15/0037; G09F 15/0062; G09F 15/0068; G09F 15/0087; G09F 19/22; G09F 3/1446; G09F 7/002
See application file for complete search history.

(56) References Cited

U.S. PATENT DOCUMENTS

| 5,323,836 A * | 6/1994 | Tuttle ................. G09F 15/0068 160/135 |
| 2008/0080930 A1 * | 4/2008 | Truijens .............. G09F 15/0006 403/373 |

(Continued)

FOREIGN PATENT DOCUMENTS

| KR | 10-0831047 | 5/2008 |
| WO | WO 02/33685 | 4/2002 |

(Continued)

OTHER PUBLICATIONS

ISA Written Opinion for PCT/EP2012/067256.
International Search Report dated Feb. 24, 2012.

*Primary Examiner* — Gary Hoge
(74) *Attorney, Agent, or Firm* — Hoffmann & Baron, LLP

(57) ABSTRACT

The invention relates to a display arrangement including a foot which supports a plurality of panels, which are flexibly interconnected by means of connecting elements, a lifting device and a receiving device that can be lowered into the ground. The receiving device is designed to receive the panels, folded together, including the foot and the lifting device. The lifting device is designed to raise the panels out of the receiving device and to lower the panels into the receiving device. The panels can be folded together in a barrel shape around the foot and in particular also around the lifting device. The receiving device is designed to receive the panels folded together in a barrel shape around the foot and more particularly also around the lifting device.

14 Claims, 7 Drawing Sheets

(51) Int. Cl.
*G06F 3/14* (2006.01)
*G09F 9/302* (2006.01)
*G09F 15/00* (2006.01)
*G09F 19/02* (2006.01)
*G09F 7/00* (2006.01)

(52) U.S. Cl.
CPC ...... *G09F 15/0037* (2013.01); *G09F 15/0062* (2013.01); *G09F 15/0068* (2013.01); *G09F 15/0087* (2013.01); *G09F 19/02* (2013.01); *G09F 19/228* (2013.01); *G09F 27/007* (2013.01); *G09F 2027/001* (2013.01); *G09G 2320/041* (2013.01); *G09G 2330/04* (2013.01); *G09G 2354/00* (2013.01); *G09G 2360/144* (2013.01)

(56) References Cited

U.S. PATENT DOCUMENTS

2008/0250686 A1* 10/2008 Lee .................... G09F 15/0081
                                                    40/606.09
2011/0181494 A1*  7/2011 Wong ................... G09F 9/3026
                                                    345/1.3
2012/0017477 A1*  1/2012 Sipperley ............... B61D 3/16
                                                    40/606.03
2012/0147463 A1*  6/2012 Jung .................... G09F 7/002
                                                    359/443
2014/0232947 A1*  8/2014 George, II ............. G09F 21/04
                                                    348/837
2014/0259634 A1*  9/2014 Cox .................... G09F 9/3026
                                                    29/592.1
2015/0289682 A1* 10/2015 Evitt .................. G09F 15/0012
                                                    211/183
2016/0247424 A1*  8/2016 Salazar
                         Rodriguez .......... G09F 15/0025

FOREIGN PATENT DOCUMENTS

WO    WO 2008/047970    4/2008
WO    WO 2010/146070    12/2010

* cited by examiner

BARREL-SHAPED FOLDABLE AND LOWERABLE DISPLAY ARRANGEMENT

CROSS-REFERENCE TO RELATED APPLICATIONS

This application is a National Phase application of International Application No. PCT/EP2012/067256 filed Sep. 5, 2012 which claims priority to European Patent Application No. EP 11180778.0 filed Sep. 9, 2011, the disclosures of which are incorporated herein by reference.

BACKGROUND

The invention relates to a display arrangement consisting of a foot which supports a number of panels that are movably interconnected by means of connection elements, a lifting device, and a receiving device that can be lowered into the ground and that is designed to receive the panels, folded together, along with the foot and lifting device, wherein the lifting device is designed to raise the panels from the receiving device and to lower the panels into the receiving device.

Document WO 2010/146070 A1 discloses such a display arrangement having an odd number of rectangular panels. The panels are movably interconnected by connection elements on their longitudinal sides, wherein the middle panel is fastened via its lower transverse side to the foot of the display arrangement. In order to present image information by means of the panels of the display arrangement, the panels are arranged in a plane.

The known display arrangement can be lowered in the ground, for which purpose the panels are folded together. Here, the panels fold together in accordance with a leporello fold or concertina fold around the middle panel fastened to the foot. The foot, with the panels folded together, then lowers into a receiving device provided in the ground until the entire display arrangement is beneath ground level.

In the case of the known display arrangement it has proven to be a disadvantage that the receiving device has to be very long in order to receive the foot and the folded-together panels. This impairs the delivery of the display arrangement and increases the cost of installation, since a very deep hole has to be dug in the ground.

In the case of the known display arrangement it has also proven to be a disadvantage that it is no longer possible to display any image information by means of the display arrangement once the panels have been folded together in a leporello-like manner. It has also been found that the planar arrangement of the panels is not always optimal for the display of information. For example, a number of groups of viewers may wish to view the image information but may be located at different positions in front of or beside the display arrangement.

SUMMARY

The object of the invention is to create a lowerable display arrangement with which the aforementioned disadvantages are avoided. This object is achieved in accordance with the invention in that the panels can be folded together in a barrel-shaped manner around the foot and in particular also around the lifting device, and in that the receiving device is designed to receive the panels folded together in a barrel-shaped manner around the foot and in particular also around the lifting device.

The advantage is thus achieved that viewers may be located at different positions around the display arrangement and at any rate can view at least some of the image information displayed by means of the display arrangement. The panels folded in a barrel-shaped manner can then be lowered with the foot easily and in a space-saving manner into the receiving device. The viewers can continue to view the image information even during the lowering process. Due to the folding of the panels in a barrel-shaped manner when lowered into the receiving device, the receiving device can be formed advantageously as a cylinder, whereby a cost-effective receiving device is obtained.

It is particularly advantageous that the panels can be folded together in a barrel-shaped manner around the foot, whereby the length of the receiving device necessary to receive the panels along with the foot reduces and therefore both the transport and the installation of the display arrangement are simplified. A further very advantageous reduction of the length of the receiving device is provided as a result of the fact that the foot can be pushed together telescopically into the panels folded together in a barrel-shaped manner. The advantageous folded state of the display arrangement in each case can be determined by the provision of different sensors.

BRIEF DESCRIPTION OF THE DRAWINGS

Further advantageous embodiments of the display arrangement according to the invention will be explained in greater detail hereinafter on the basis of the drawings.

DETAILED DESCRIPTION

Figure 1:
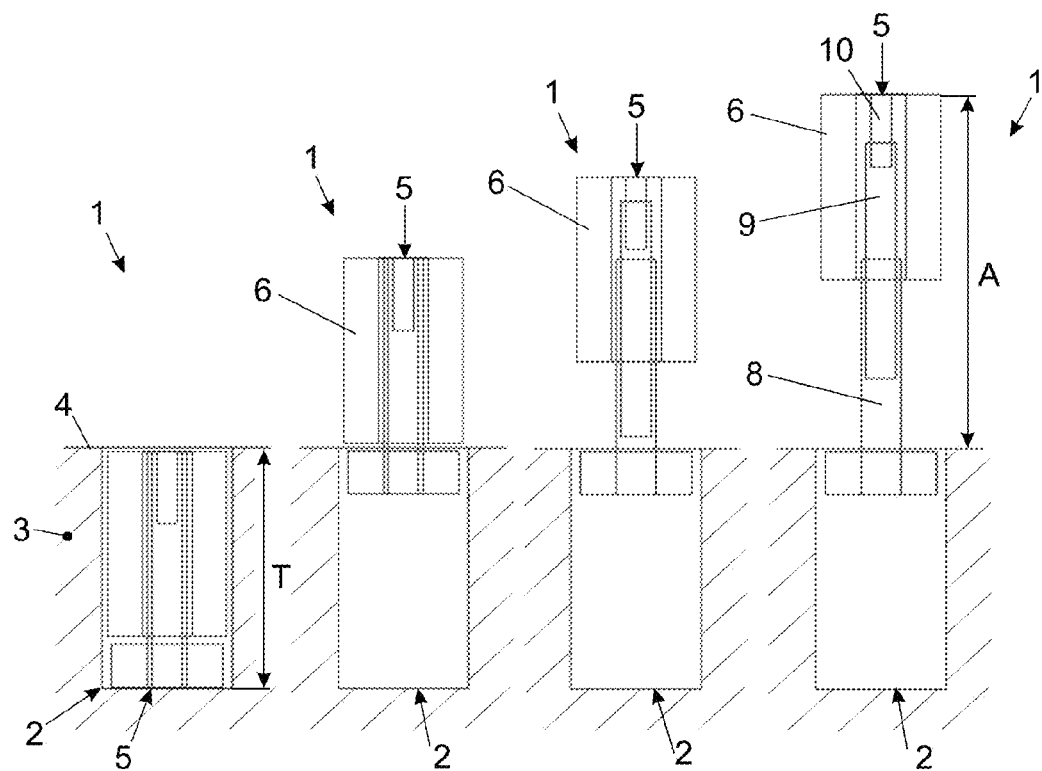
FIG. 1 shows a display arrangement in four schematic illustrations arranged side by side.

FIG. 1 shows a display arrangement 1 in four schematic illustrations arranged side by side. In the left-hand illustration in FIG. 1 the display arrangement 1 is lowered completely into a receiving device 2 of the display arrangement 1, wherein the receiving device 2 is buried in the ground 3, at least in part, below ground level 4.

The display arrangement 1 further comprises a foot 5 which supports a number of panels 6 that are movably interconnected by means of connection elements 7. In the further illustrations of the display arrangement 1 in FIG. 1, the display arrangement 1 is illustrated when raised above the ground level 4.

The foot 5 forms a lifting device for raising and for lowering the panels 6, said lifting device being formed by three tubes 8, 9 and 10 (not illustrated in greater detail in the drawings) which can be pushed into one another telescopically, servomotors and a control arrangement for controlling the servomotors. To raise the display arrangement 1, the tubes 8, 9 and 10 are extended from one another by the servomotors, and to lower the display arrangement 1 are pushed together again. Due to the provision of a foot 5 that can be pushed together telescopically, the advantage achieved is that the installation depth T of the entire display arrangement 1 in the ground 3 can be kept very low, wherein a sufficiently high display height A is simultaneously achieved for the display arrangement 1.

The panels 6 can be folded together in a barrel-shaped manner around the foot 5, this being explained in greater detail with reference to the following drawings. Due to the barrel-shaped folding together of the panels 6 around the foot 5, the advantage achieved is that the installation depth T is particularly low, since the foot 5 pushed together telescopically finds space within the height of the panels 6 folded together in a barrel-shaped manner.

Figure 2:
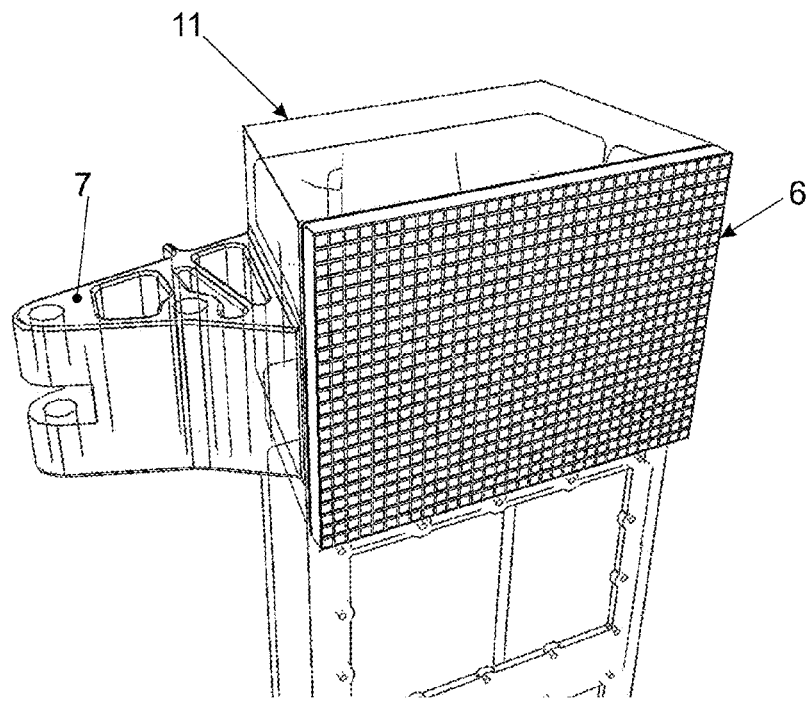
FIG. 2 shows a panel 6 of the display arrangement according to FIG. 1.

A panel 6, which is formed by a generally known LED module, is illustrated in FIG. 2. The LED module comprises a plurality of individual LEDs, with which the image information to be presented by means of the display arrangement is displayed. Alternatively, other known modules with picture elements for video presentation can also be fitted, such as OLED modules, SLED modules, laser modules, etc. In the case of use outdoors, these modules are designed so as to be waterproof. A module holder 11, to which a number of panels 6 can be fastened, is also illustrated schematically in FIG. 2, wherein only the uppermost panel 6 is illustrated in FIG. 2. Fans for cooling the panels 6 and also the control electronics for controlling the panels 6 may also be provided in the module holder 11. In the case of use outdoors, the module holders 11 are designed so as to be weatherproof.

Figure 3:
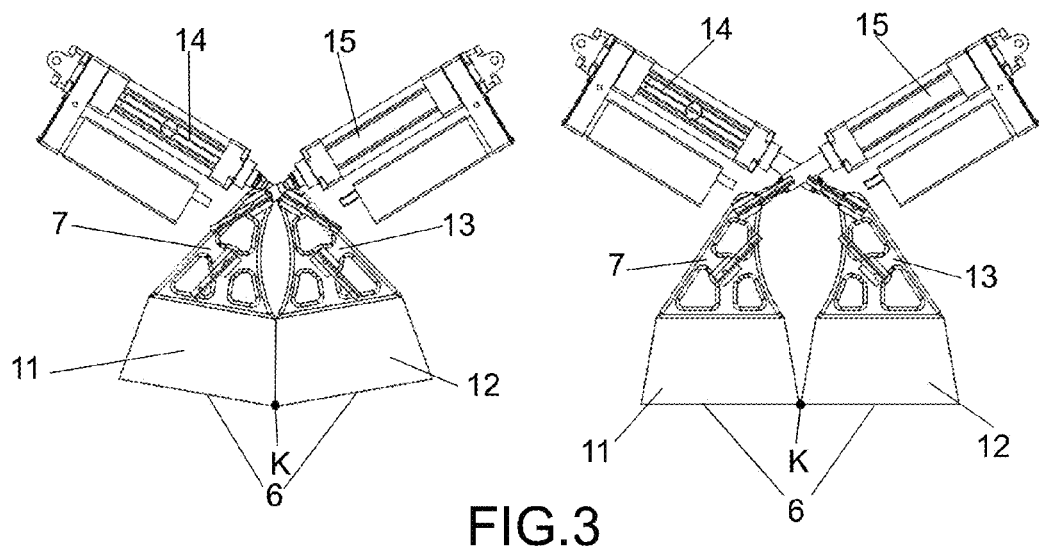
FIG. 3 shows module holders of the display arrangement according to FIG. 1 inclusive of the central mounts for the entire image area.

One of the connection elements 7, by means of which the module holders 11 are movably interconnected, is also illustrated in FIG. 2. The module holder 11 and a second module holder 12 of the display arrangement 1 are illustrated in FIG. 3 and are interconnected over the housing of the display arrangement 1 by means of connection elements 7 and 13 and servomotors 14 and 15. In the left-hand illustration in FIG. 3 the module holders 11 and 12 are positioned in such a way that the panels 6 fastened to the module holders 11 and 12 are tilted with respect to one another and assume the folded state of a folding process. By stringing together module holders positioned in this position, the panels 6 are folded in a way that will be explained in greater detail hereinafter. In the right-hand illustration in FIG. 3 the module holders 11 and 12 are positioned in such a way that the panels 6 fastened to the module holders 11 and 12 form a plane or are located in a folded state of a fold-free plane.

Figure 11:
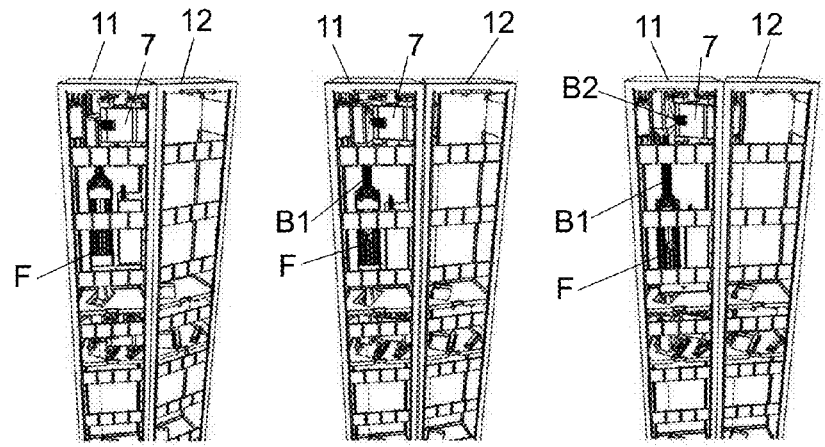
FIG. 11 shows the folding movement of two adjacent module holders of the display arrangement according to FIG. 1.
Figure 12:
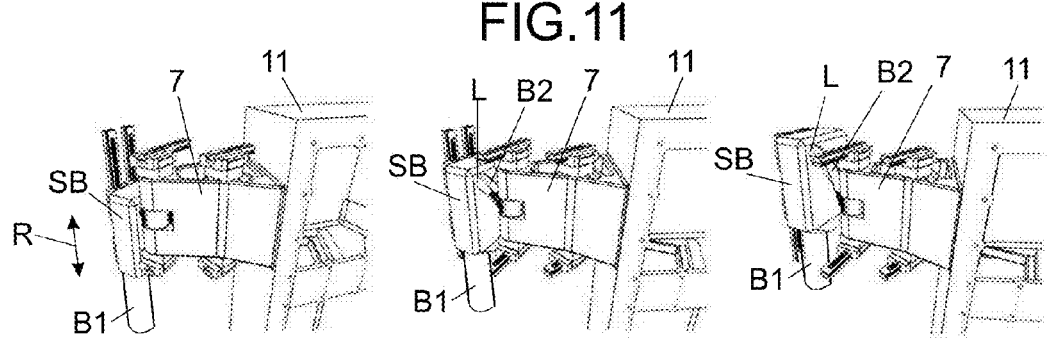
FIG. 12 shows the connection elements of the module holder according to FIG. 11.

FIG. 11 shows the folding movement of two adjacent module holders 11 and 12. As illustrated in FIGS. 3 and 12, during the folding movement the connection elements 7 of one module holder 11 are always mounted via corresponding linear sliding guides L within the adjacent module holder 12, in which the fold drive F for the respective module holder is also located. This fold drive F consists, per module holder, of two servomotors, each having two pin-slide kinematic elements per module holder, that is to say a total of four pin-slide kinematic elements. Each pin-slide kinematic element consists of a pin B1, a slide block SB, and a pin B2. If the spindle of the servomotor is extended (from left to right in the sequence of images in FIG. 11), the slide blocks SB thus press the pin B1, located on the module holder to be folded, in the direction R in which the module holder is to be folded. With corresponding manufacturing precision, a play-free folding movement can thus be performed.

If necessary, corresponding anchor systems (not illustrated in greater detail in the drawings), each consisting of a pin that locks in a hole, can lock the individual module holders in the different folded states so as to thus reduce or eliminate any pressure on the fold drives.

If necessary, the display arrangement (not illustrated in greater detail in the drawings) can also be designed such that, in the event of unfolding, springs are pretensioned which are connected to the slide blocks SB. The display arrangement can thus be brought back again automatically into the folded state, for example in the event of a power failure, without the need for actuation of the servomotors for this purpose. The single self-holding state of the image wall in this embodiment is the folded state.

Figure 13:
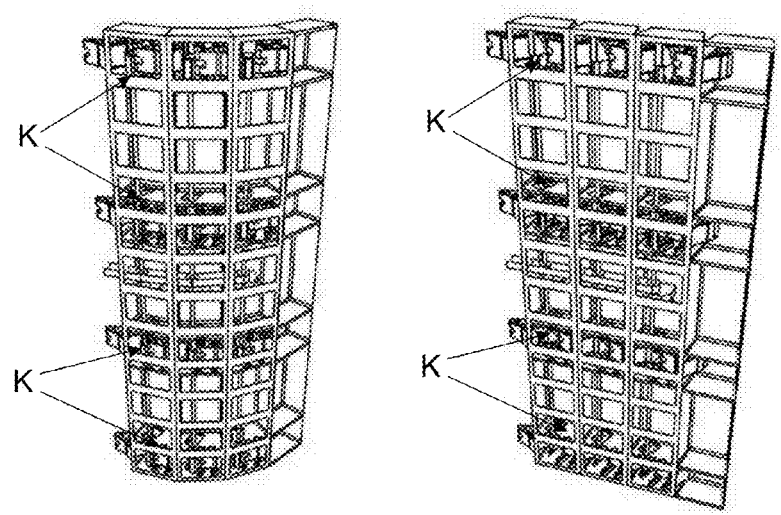
FIG. 13 shows module holders with a main fold drive, which drives a number of module holders via a chain drive during the folding process.

Alternatively to the variant of the fold drive illustrated in FIG. 11, FIG. 13 shows a possibility for producing a main fold drive that drives a number of module holders via a chain drive K during the folding process. Individual fold drives with servomotors in each module holder can thus be saved. The chain drive K could be formed such that in each case four slide blocks SB are displaced within a module holder via a spindle (driven via a spindle nut mounted in the module holder). The drive of the spindle nut(s) could be conveyed here via a belt or via a chain or via a cable over a number of module holders into the middle module holder for example, where the main fold drive for the folding process is ultimately located.

Figure 4:
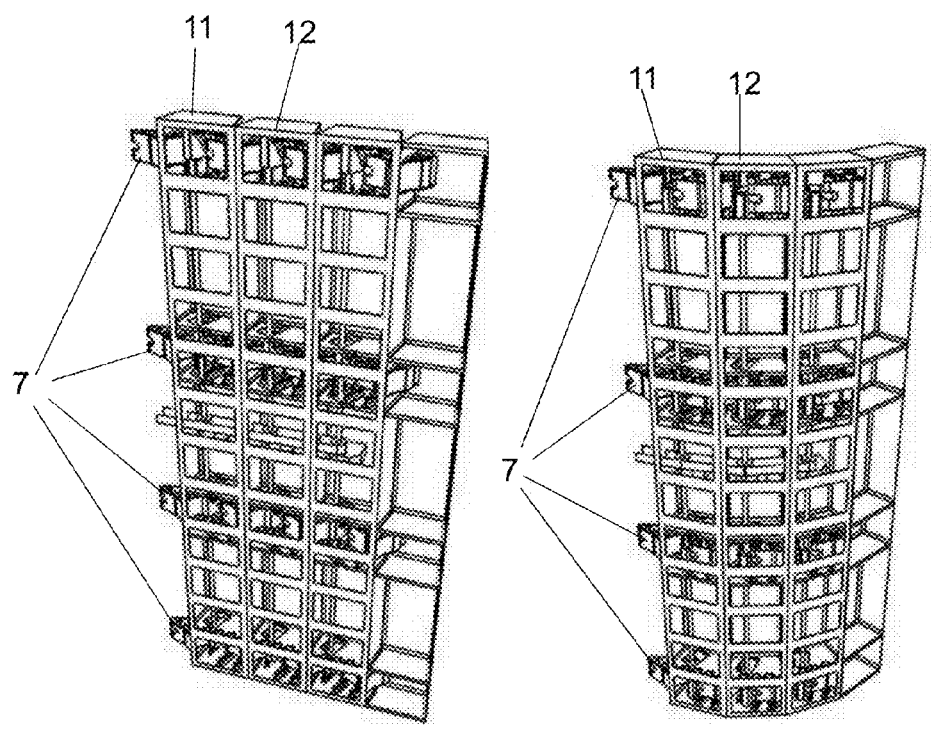
FIG. 4 shows an oblique view of module holders, already interconnected, of the display arrangement according to FIG. 1.

In FIG. 4 shows the module holders 11 and 12 as well as two further module holders, to the left in the folded state of the fold-free plane and to the right in the folded state of a folding process.

Figure 5:
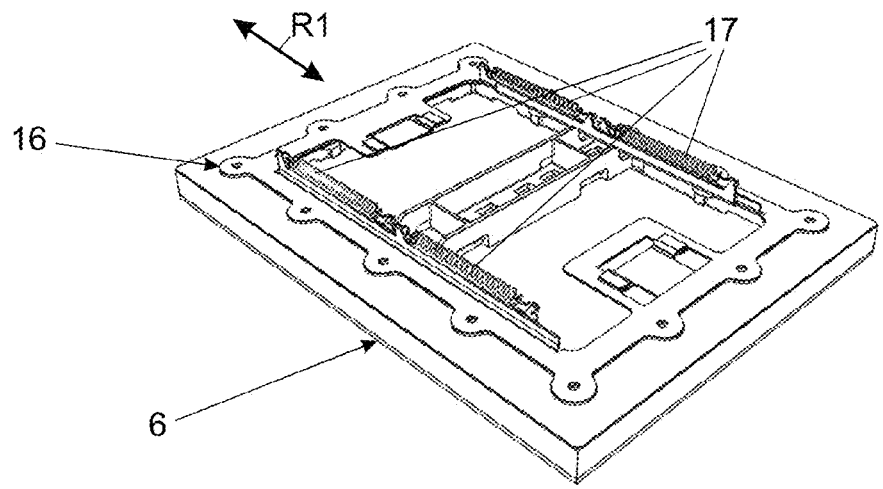
FIG. 5 shows the rear face of the panel 6 with fastening means.

In FIG. 5 the rear face of the panel 6 is illustrated with fastening elements 16 for fastening the panel 6 to the module holder 11. The fastening means 16 comprise springs 17, whereby the panel 6 is fastened to the module holder 11, resiliently and displaceably in the directions R1. It is thus made possible for the panels 6 to bear against one another, substantially without play, at the contact point K of their longitudinal edges illustrated in FIG. 3. The advantage is thus achieved that the image information can be displayed particularly effectively and uniformly by means of the display arrangement 1. The same construction can also be implemented in the orthogonal direction (not illustrated in the drawing) in order to resiliently mount the panel 6 in the direction orthogonal to R1.

Figure 6:
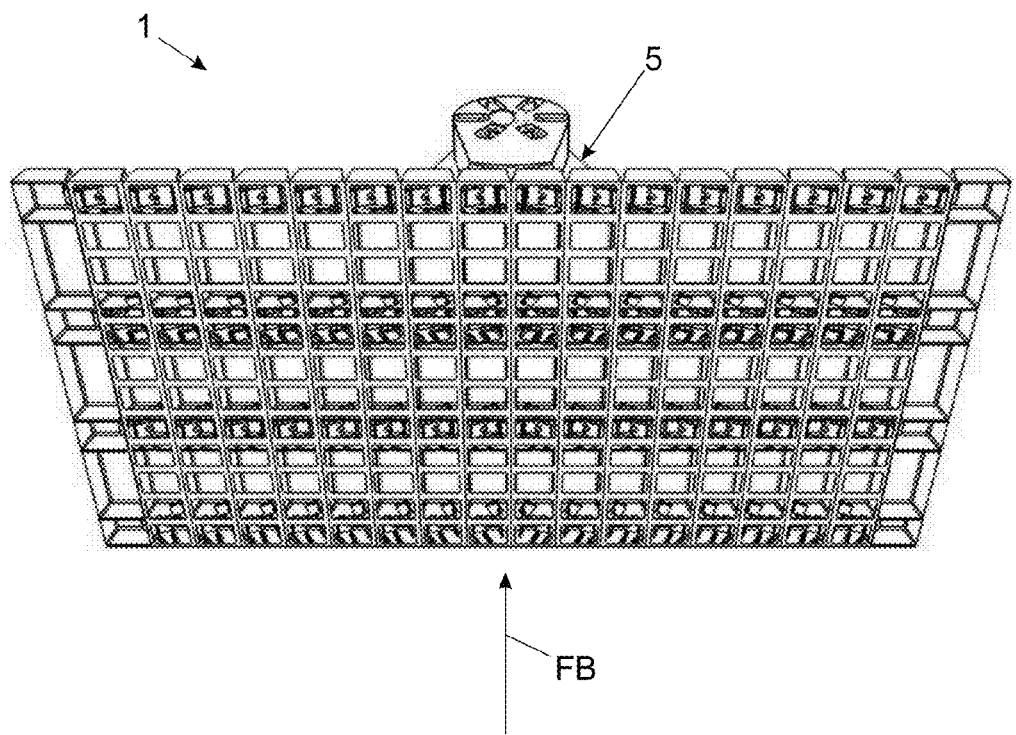
FIGS. 6, 7 and 8 show module holders of the display arrangement according to FIG. 1 in different folded states.
Figure 7:
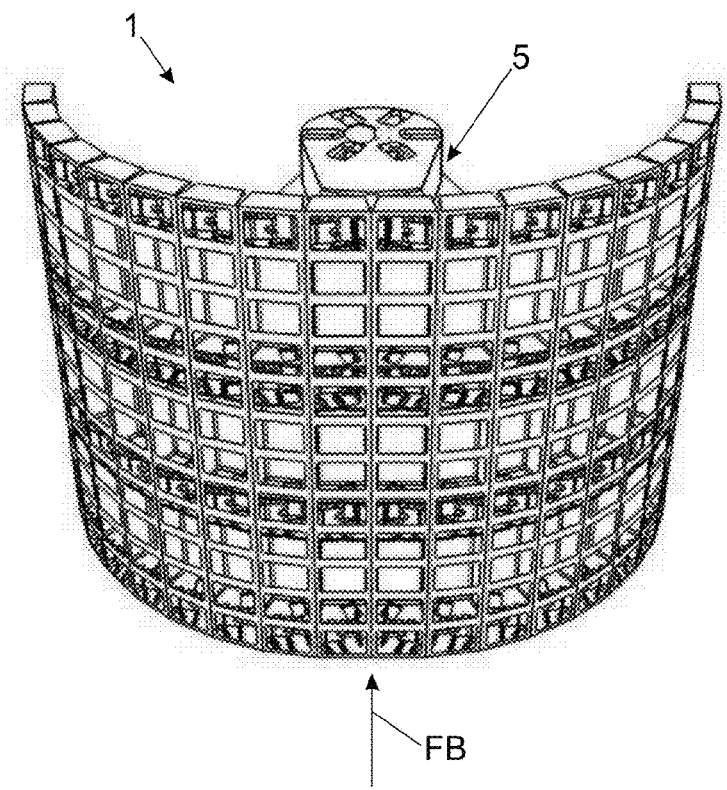
Figure 8:
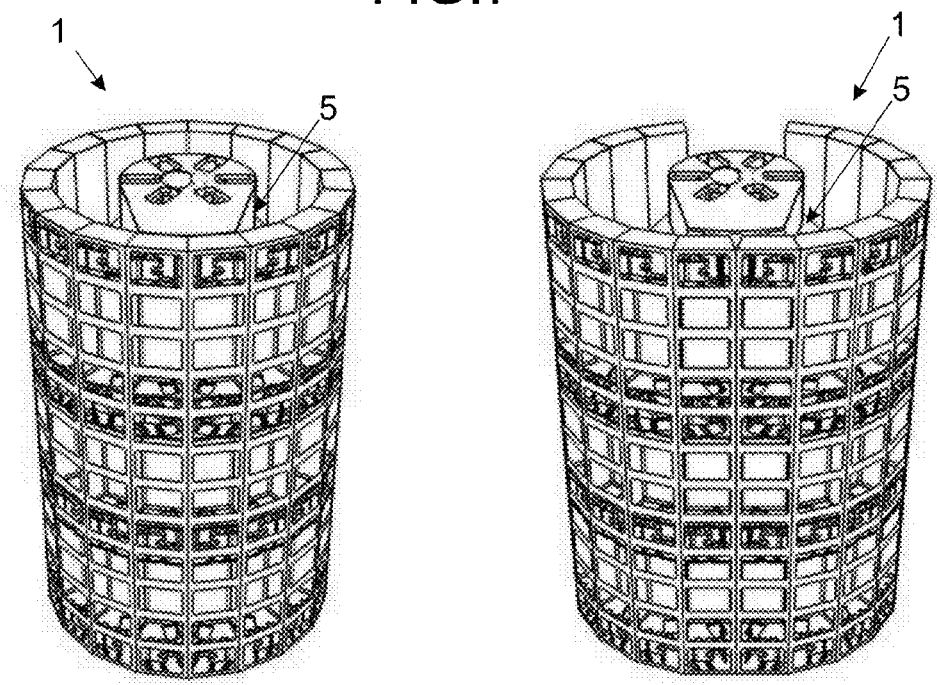

Module holders of the panels 6 are illustrated in different folded states in FIGS. 6, 7 and 8. In FIG. 6 the module holders (and therefore also the panels 6) are arranged in a plane perpendicular to a frontal viewing direction FB and thus assume the folded state of a fold-free plane. A planar arrangement of the panels 6 corresponds to display arrangements according to the prior art.

The display arrangement 1 according to the invention however can also be folded in a folded state of a semi-circular fold in the frontal viewing direction FB, as is illustrated in FIG. 7. This folded state is then particularly advantageous if viewers are to be able to see at least some of the image information in a specific viewing region in front of and beside the display arrangement. Furthermore, this semi-circular fold is then advantageous if a strong wind is blowing, and the wind resistance and therefore the pressure on the foot 5 can be reduced as a result of the fold.

The module holders (and therefore also the panels 6) are shown to the right in FIG. 8 in the folded state of a sectional fold, wherein the panels 6 cover a certain angular range of the full circle. This folded state is then particularly advantageous if viewers also stand partly behind the display arrangement 1 and are to be able to see at least some of the image information, or if a very strong wind is blowing.

The module holders (and therefore also the panels 6) are shown to the left in FIG. 8 in the folded state of the barrel-shaped fold, wherein the panels 6 deliver image information in all directions, similarly to an advertising column. This folded state is then particularly advantageous if viewers stand around the display arrangement 1 and are to be able to see at least some of the image information or if a particularly strong wind is blowing. The panels 6 of the display arrangement 1 are then also brought into this folded state of the barrel-shaped fold if the display arrangement 1 is to be lowered. It is also particularly advantageous that the foot 5, which can be pushed together telescopically, may also only be pushed together to such an extent when lowered that the panels 6 folded in a barrel-shaped manner can all still be seen above the ground level 4. The lowering process can be interrupted in this position and the image information viewed well by viewers standing in the vicinity.

Figure 14:
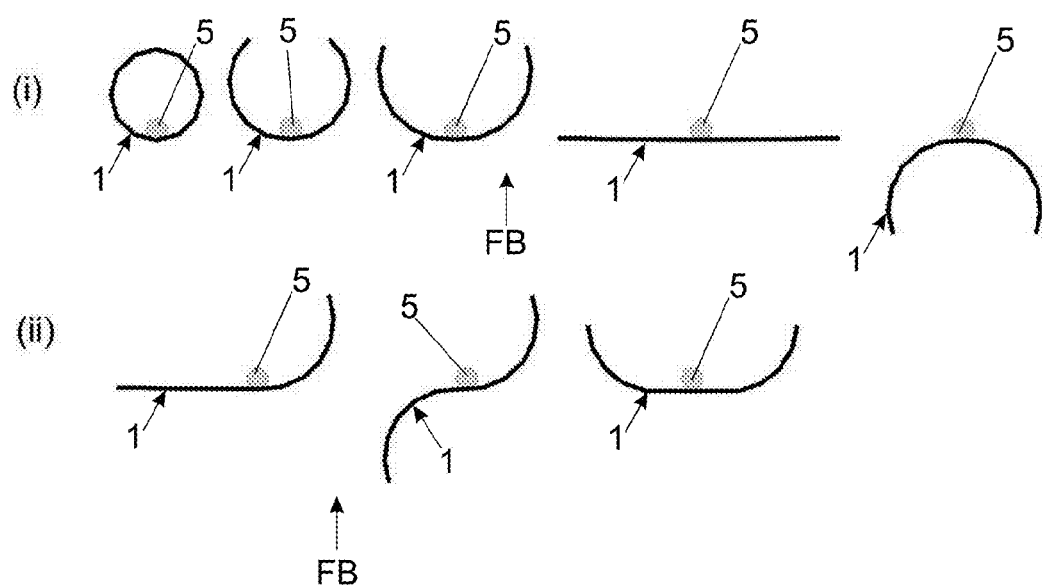
FIG. 14 symbolically shows a number of possible folded states of the display arrangement according to FIG. 1.

Further folded states of the display arrangement 1 are illustrated symbolically in FIG. 14. Folded states when the module holders are driven via a central servomotor as a main fold drive with a chain drive, belt drive or cable drive are illustrated in the first line (i) of FIG. 14. From left to right, the barrel-shaped fold, the sectional fold, the semi-circular fold in the frontal viewing direction FB, the fold-free plane and the semi-circular fold against the frontal viewing direction FB are illustrated as folded states. Folded states if each module holder is driven by an individual servomotor are illustrated in the second line (ii) of FIG. 14. In principle, any arbitrary folded state is possible here, wherein a hockey-stick-shaped fold, an S-shaped fold and a U-shaped fold are illustrated from left to right as folded states.

Figure 9:
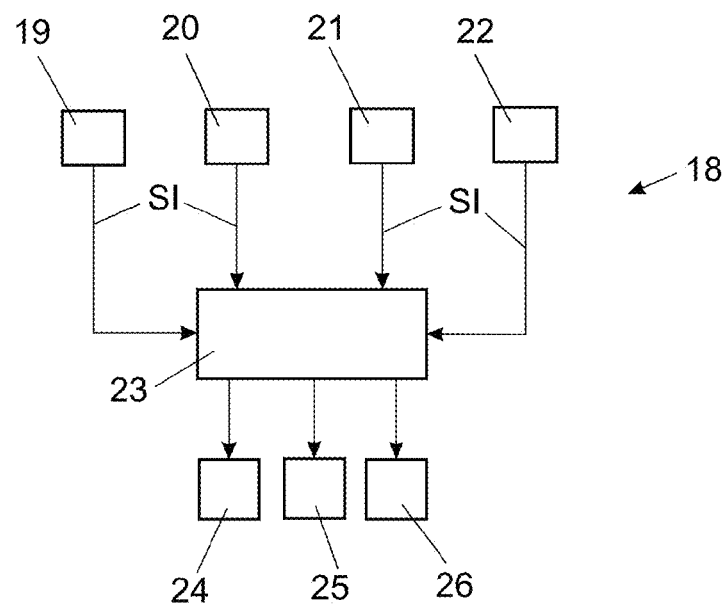
FIG. 9 shows a symbolic block diagram of the electronic control unit of the display arrangement according to FIG. 1.

A symbolic block diagram of the electronic control unit 18 of the display arrangement 1 is illustrated in FIG. 9. The display arrangement 1 comprises a number of sensors for delivering sensor information SI. In accordance with the exemplary embodiment, the display arrangement comprises a wind sensor 19 for measuring the wind strength, a temperature sensor 20 for measuring the ambient temperature of the display arrangement 1, a brightness sensor 21 for measuring the brightness in the region of the display arrangement 1, and a sensor 22 for detecting people in the vicinity of the display arrangement 1. The sensor 22 can be formed for example by a laser scanner, by laser-line arrays, by detection mats around the display arrangement 1, or by ultrasonic sensors. For example, an air moisture sensor, an air pressure sensor, or a dew point sensor can be provided as further sensors.

The sensor information SI of the sensors 19 to 22 can be fed to a control arrangement 23 for controlling drive arrangements of the display arrangement 1. The control arrangement 23 can be formed by what is known as an ASIC, FPGA, SPS or a computer, by which a control program is processed. The servomotors 14 and 15 and also all other servomotors for adjusting the position of the module supports in order to move the panels 6 into the different folded states are provided as a drive arrangement 24. The servomotors for telescopically pushing together and extending the foot 5 are also provided as a drive arrangement 25. Furthermore, a servomotor is provided as a drive arrangement 26 for rotating the module supports about the foot 5. Further drive arrangements can be provided, for example in order to slide a liquid-tight cover over the panels 6 lowered into the receiving device 2. A cover can also be fastened, even directly for example, to the upper face of the foot 5 however so as to thus automatically tightly seal the receiving device 2 after each lowering of the display device 1.

The control arrangement 23 is now designed so as to control the drive arrangements 24 to 26 in a manner dependent on the sensor information SI transmitted to it. Here, for example in the event of rising measured wind speed, the area of the display arrangement 1 exposed to wind is reduced by changing the folded state and by rotating the panels 6 about the foot 5 and by lowering the panels 6 into the receiving device 1. With no wind or light wind the panels 6 are in the folded state of the fold-free plane. If the wind strength increases, the folded state can then be formed in a more streamlined manner, and the curved side of the panels 6 can be rotated in the direction of the wind. If the wind is too strong and damage to the display arrangement 1 is feared, the control arrangement then controls the drive arrangement 24 so as to fold the panels 6 in a barrel-shaped manner and the drive arrangement 25 to push together the foot 5 and lower the display arrangement 1.

The control arrangement controls the drive arrangements on the basis of the temperature information delivered by the temperature sensor 20, in such a way that, at particularly low measured temperatures and particularly high measured temperatures, the panels 6 are lowered into the receiving device. The display arrangement 1 could thus be lowered automatically, for example at temperatures below minus 10 degrees Celsius or above 40 degrees Celsius, so as to avoid damage to the display arrangement.

Viewers can only very poorly view the image information presented by the display arrangement 1 if the sun is diagonally behind the panels 6 and thus produces back light. The control arrangement 23 is now designed to rotate the panels 6 about the foot 5 on the basis of the brightness measured by at least two brightness sensors 21 fitted at different positions of the display arrangement, such that the viewer is not disturbed by back light. This, of course, always occurs in conjunction with the possible positions for the viewer in front of or around the display arrangement 1. The brightness of the image information delivered by the panels 6 can also be adjusted on the basis of the brightness information.

Furthermore, it may be that the viewers move around the display arrangement or stand still alongside the display arrangement 1. The display arrangement 1 now comprises a sensor 22 for detecting people in the vicinity of the display arrangement 1. The control arrangement 23 controls the drive arrangement 26 so as to rotate the panels 6 about the foot 5 in accordance with the position of the detected people or viewers. Here, a majority decision can be implemented if only one person is detected on one side of the display arrangement and a group of people is detected on the other side of the display arrangement so as to give preference to the group of people.

Figure 10:
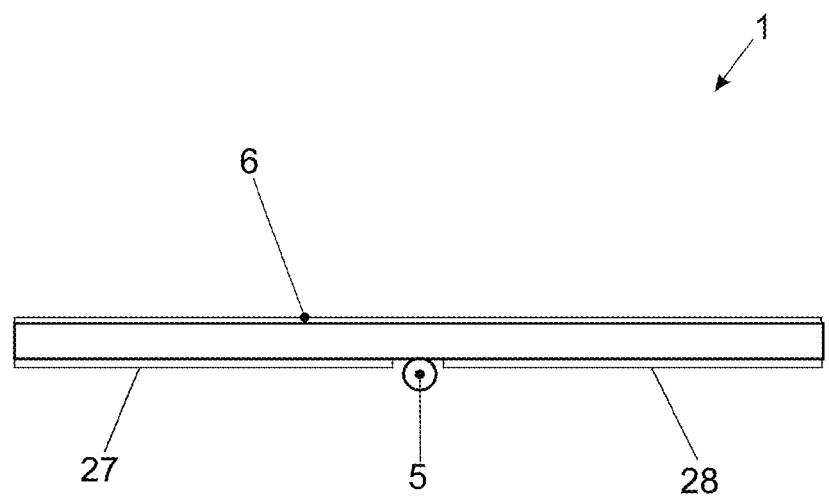
FIG. 10 shows the rear face of the module holder of the display arrangement according to FIG. 1, to which solar cells are fastened.

The display arrangement 1 is illustrated from above in FIG. 10 in its folded state of the fold-free plane. The panels 6 are fastened on one side of the module holders and solar cells 27 and 28 for generating power are fastened on the opposite side. If no image information is currently being displayed or if nobody is currently located in the vicinity of the display arrangement, the control arrangement can then control the solar cells 27 and 28 so as to track the sun in accordance with the altitude thereof on the basis of the brightness information of the brightness sensors 21 in order to attain a maximum energy yield.

The display arrangement 1 further comprises loudspeakers (not illustrated in greater detail in the drawings), which are designed to play back sound information. The control arrangement 23 is now also designed to specify or to change the image information displayed by means of the display arrangement 1 and the sound information delivered by loudspeakers of the display arrangement 1 in accordance with the sensor information SI. For example, weather warnings or weather information could thus be reproduced in the form of colours or sounds.

In accordance with a further advantageous embodiment of the invention the receiving device lowerable into the ground comprises a heat pump in order to cool air in the ground as a cooling medium and to then introduce it into the module supports in order to cool the panels 6. An alternative embodiment uses a compressor in order to suck in the cooler air in the shaft and to then introduce this into the module supports to cool the panels 6. Effective cooling of the panels 6 is thus obtained.

It should be mentioned that parts of the foot of the display arrangement could also be screwed together in a screw-like manner in order to lower the display arrangement into the receiving device. In the case of such a spiral lift a shaft having a recessed helix on the periphery would be provided in the tubes of the foot, a peg provided on the tubes engaging in said helix. If the shaft is driven by means of a servomotor about its own axis, the display arrangement then raises or lowers from/into the receiving device. It would also be possible, with a reversed operating principle, to provide the helix on the periphery of the tubes and to provide the peg on the shaft.

It would also be possible to raise or to lower the display arrangement from/into the receiving device using a scissor mechanism.

It should be mentioned that the display arrangement according to the invention does not necessarily have to be lowered in the ground with its receiving device for installation. Regardless of the fact that the receiving device can of course also be lowered into gravel or other materials, the receiving device could also be installed however lowered in an artificially created ground. For example, the deck or between-deck of a ship could be understood to be an artificially created ground. The receiving device could also be installed in a lorry or delivery van in order to raise the panels, for example, from the roof of the lorry or delivery van. Installation of the receiving device in the roof of a house or multi-story building would also be conceivable.

What is claimed is:

1. A display arrangement comprising:
   a foot which supports a number of panels that are movably interconnected by means of connection elements, a lifting device, and a receiving device that can be lowered at least in part into the ground and that is designed to receive the panels, folded together, along with the foot and lifting device, wherein the lifting device is designed to raise the panels from the receiving device and to lower the panels into the receiving device, wherein the panels can be folded together in a barrel-shaped manner around the foot and further wherein the receiving device is designed to receive the panels folded together in the barrel-shaped manner around the foot.

2. The display arrangement according to claim 1, wherein the foot comprises the lifting device which can be pushed together telescopically in order to lower the panels in the receiving device.

3. The display arrangement according to claim 1, wherein the panels can be folded into at least one of the following folded states: barrel-shaped fold; sectional fold; hockey-stick-shaped fold; S-shaped fold; U-shaped fold; semi-circular fold in a frontal viewing direction; semi-circular fold against the frontal viewing direction; and fold-free plane.

4. The display arrangement according to claim 3, wherein at least one sensor for delivering sensor information is provided, and wherein a control arrangement for controlling a drive arrangement is provided, wherein the control arrangement controls the drive arrangement so as to fold the panels in one of the folded states in response to the sensor information.

5. The display arrangement according to claim 4, wherein the sensor is formed by a wind sensor, and wherein the control arrangement is designed, in the event of rising measured wind speed, to reduce the area of the display arrangement exposed to wind by at least one of changing the folded state, rotating the panels about the foot, and lowering the panels into the receiving device.

6. The display arrangement according to claim 4, wherein the sensor comprises a temperature sensor, and wherein the control arrangement is designed to lower the panels into the receiving device in response to the measured temperature being at least one of a predetermined low measured temperature and a predetermined high measured temperature.

7. The display arrangement according to claim 4, wherein the sensor is formed by a brightness sensor, and wherein the control arrangement is designed to rotate the panels about the foot in response to the measured brightness in order to reduce disturbance to the viewer caused by solar irradiation when viewing the image information.

8. The display arrangement according to claim 7, wherein the control arrangement is designed to change the brightness of the image information reproduced by means of the panels in response to the measured brightness and the folded state of the panels.

9. The display arrangement according to claim 4, wherein the sensor is formed by a sensor for detecting people in the vicinity of the display arrangement, and wherein the control arrangement is designed to rotate the panels about the foot in the direction of the majority of detected people in response to the detection result.

10. The display arrangement according to claim 1, wherein the panels comprise at least one of LEDs and laser modules fastened to module supports for displaying the image information, wherein the module supports are mounted pivotable relative to one another by the connection elements, and wherein the at least one of LEDs and laser modules are fastened displaceably or resiliently on the module supports so that adjacent panels bear against one another without play.

11. The display arrangement according to claim 10, wherein a drive arrangement for folding the panels is fastened to the module holders.

12. The display arrangement according to claim 10, wherein at least one solar cell is fastened on the side of the module supports facing away from the panels.

13. The display arrangement according to claim 12, wherein a brightness sensor is provided and the control arrangement is designed, in response to the measured brightness, to rotate the panels about the foot and to track the sun for a maximum energy yield of the solar cell.

14. The display arrangement according to claim 1, wherein, when folding around the foot, the panels are folded also around the lifting device.

\* \* \* \* \*